(12) United States Patent
Sakagami et al.

(10) Patent No.: US 7,467,026 B2
(45) Date of Patent: Dec. 16, 2008

(54) AUTONOMOUSLY MOVING ROBOT MANAGEMENT SYSTEM

(75) Inventors: Yoshiaki Sakagami, Saitama (JP); Shinichi Matsunaga, Saitama (JP); Naoaki Sumida, Saitama (JP)

(73) Assignee: Honda Motor Co. Ltd., Tokyo (JP)

( * ) Notice: Subject to any disclaimer, the term of this patent is extended or adjusted under 35 U.S.C. 154(b) by 855 days.

(21) Appl. No.: 10/917,322

(22) Filed: Aug. 13, 2004

(65) Prior Publication Data

US 2005/0065652 A1    Mar. 24, 2005

(30) Foreign Application Priority Data

Sep. 22, 2003    (JP) .............................. 2003-329283

(51) Int. Cl.
*G06F 19/00* (2006.01)
(52) U.S. Cl. ................ 700/245; 700/250; 700/258; 318/568.12; 704/E13.008; 704/231; 704/246
(58) Field of Classification Search ................ 700/245, 700/258, 250; 318/568.12; 704/E13.008, 704/231, 246, 259
See application file for complete search history.

(56) References Cited

U.S. PATENT DOCUMENTS 5,455,497 A    10/1995    Hirose et al.

6,889,118 B2 *    5/2005    Murray et al. .............. 700/250

FOREIGN PATENT DOCUMENTS

| JP | 2002-149180 | 5/2002 |
|---|---|---|
| JP | 2003-050559 | 2/2003 |
| JP | 2003050559 | * 2/2003 |

* cited by examiner

*Primary Examiner*—Khoi H. Tran
*Assistant Examiner*—Marie A Weiskopf
(74) *Attorney, Agent, or Firm*—Squire, Sanders & Dempsey L.L.P.

(57) ABSTRACT

An autonomous robot is controlled by the local robot information controller which is connected to a robot application network to which the transceiver to communicate with the autonomous robot is attached. The robot application network, a user LAN adaptive controller an information distribution manager and the third party information provider subsystem are linked with a public network. The information distribution manager acquires the information from the third party information provider subsystem on the schedule which is set by the user LAN adaptive controller. The local robot information controller receives the information distribution manager and convert it into the data that generates robot gestures. The robot performs actions in accordance to the gesture data received from the local robot information controller.

8 Claims, 10 Drawing Sheets

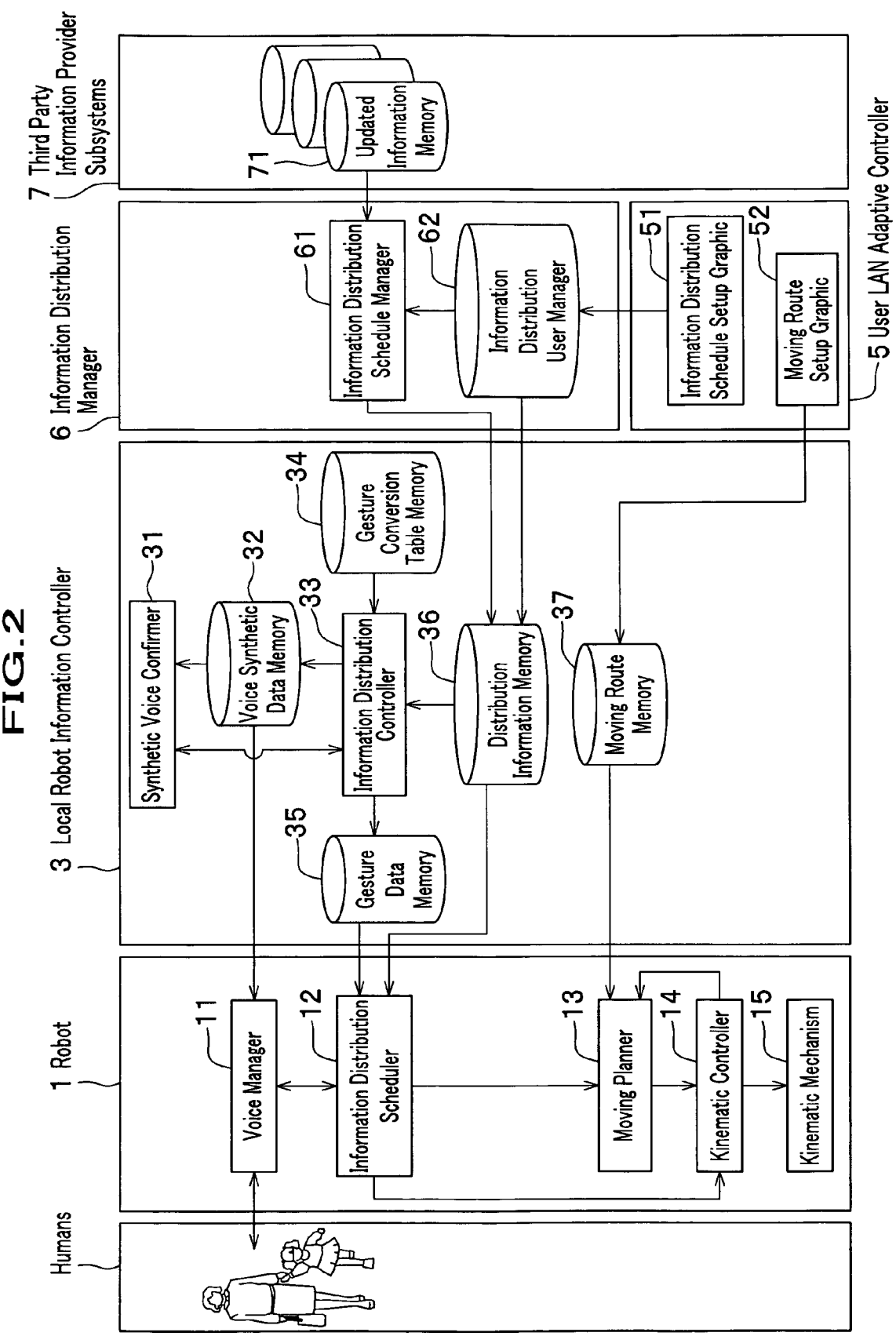

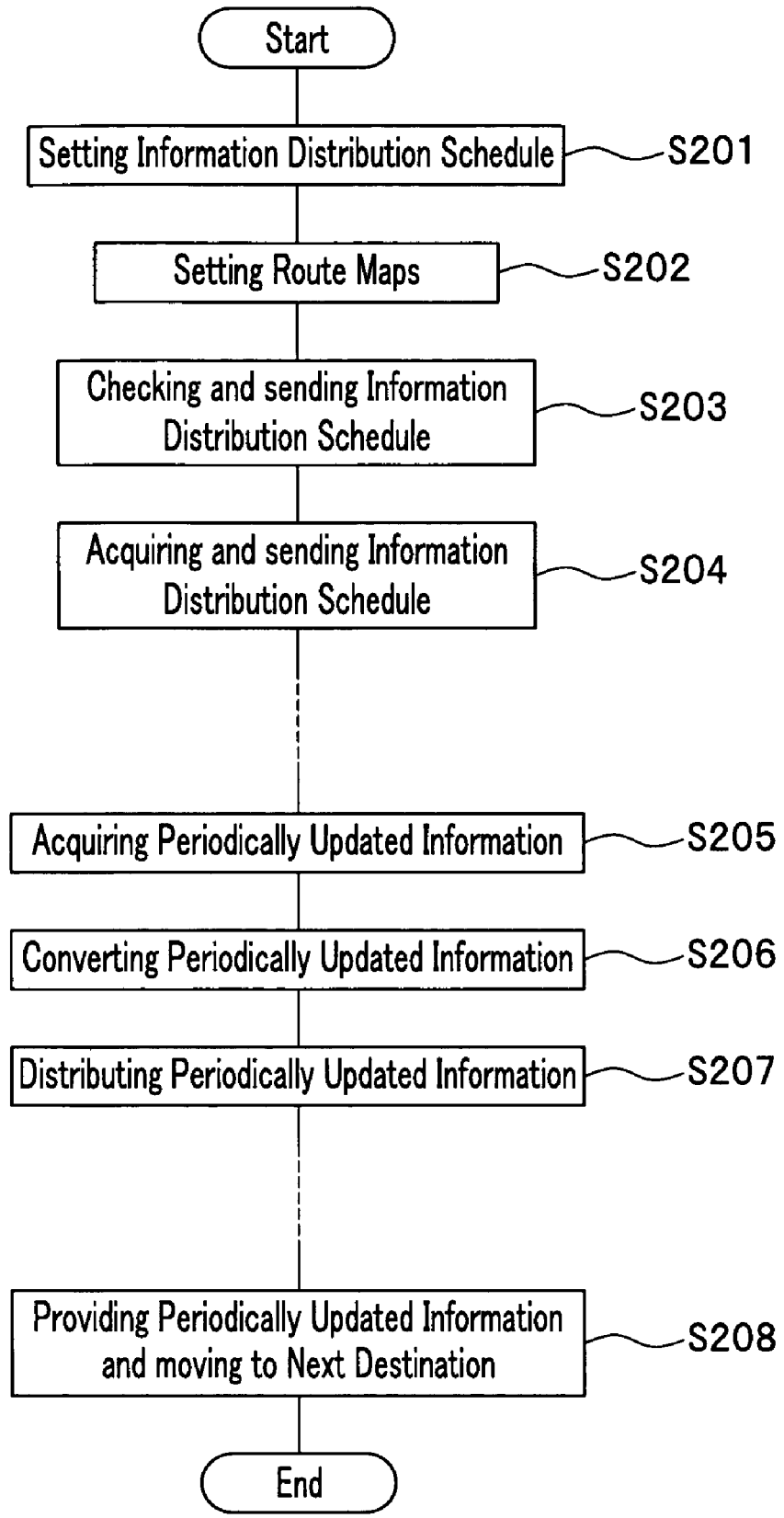

FIG.4

Information Distribution Schedule — G1

News and Weather Report

Your robot will provide News and Weather Report.
Please assign robot visiting places on a route map frame.

Kinds of Information

- ▨ Local Topical News
- ▨ News
  - ▨ General
  - ☐ International
  - ▨ Society
  - ☐ Economy
  - ▨ Sports
- ▨ Weather Report
  - ▨ World (Weather and Temperature of Major Cities)
  - ▨ Japan [Contents Setting] — B1

Time for Information Distribution

8 9 10 11 12 13 14 15 16 17 18

Time for Information Acquiring

Prior to Information Distribution: [15] Minutes

[60]   [60]   [60]
[60]   [30]

- B2 — Newest Information List
- B3 — Information Distribution Determination
- B4 — Automatic Loading Start
- B5 — Setting URL of Source Information
- B6 — Selective Reset

FIG. 5

Information Distribution Schedule — G2

Weather Report Details

| | Weather Status | Seasonal Information | Typhoon and Tornado | Today's Weather | Tomorrow Forecast |
|---|---|---|---|---|---|
| Hokkaido District | | | | | |
| Asahikawa | ☐☐☐☐ | ☐☐☐☐ | ☐☐☐☐ | ☐☐☐▨ | ☐☐☐▨ |
| Kushiro | | | | | |
| Mroran | | | | | |
| Sapporo | | | | | |
| Hakodate | | | | | |
| Tohoku District | | | | | |
| Aomori | ☐☐☐☐☐☐ | ☐☐☐☐☐☐ | ☐☐☐☐☐☐ | ▨▨▨▨☐☐ | ▨▨▨▨☐☐ |
| Akita | | | | | |
| Morioka | | | | | |
| Sendai | | | | | |
| Yamagata | | | | | |
| Fukushima | | | | | |
| Kanto Koshinnetsu District | | | | | |
| Niigata | ☐☐☐☐▨☐ | ☐☐☐☐▨☐ | ☐☐☐☐☐☐ | ▨☐▨▨☐☐ | ▨☐▨▨☐☐ |
| Ibaraki | | | | | |
| Gumma | | | | | |
| Tiba | | | | | |
| Tokyo | | | | | |
| Saitama | | | | | |
| Kanagawa | | | | | |

Close — B7

FIG.6

Information Distribution Schedule — G3

Latest Information List

| Date | Time | Kinds of Information | Contents |
|---|---|---|---|
| 2003.03.17 | 09:35 | Local Topical News | ... |
| 2003.03.17 | 09:45 | Sports News | ... |
| 2003.03.17 | 09:13 | Country Weather | ... |

B8 — Close

FIG. 9

| Kinds of Information | Gesture | Word |
|---|---|---|
| Local Topical News | Nodding | (No Specific Words) |
| Sports News | Trembling | (No Specific Words) |
| | Guts Pose | Victory, First Price, Goal, Home Run |
| | Weeping Pose | Losing Game |
| Weather Report | Nodding | (No Specific Words) |
| | Raising Hands | Clear, Fine |
| | Twisting Heads | Cloud |
| | Getting Arms Down | Rain, Snow |

(Use particular Gestures specified to the Kinds of Information if no Words found in this table)

AUTONOMOUSLY MOVING ROBOT MANAGEMENT SYSTEM

FIELD OF THE INVENTION

The present invention relates to an autonomously moving robot system wherein the robot enables to provide information to objective persons while the robot is autonomously moving in predetermined regions.

DESCRIPTION OF THE RELATED ART

Human-shaped autonomously moving robots, which enable to carry out the predetermined tasks while the robot are moving in predetermined regions such as civil purpose buildings (for example department stores) and public facilities and buildings, have recently been developed. For example, the reference 1 describes an example for such purpose as that the autonomously moving robot receives commercial advertisement from a data server which has a large data storage means and provides the contents of the received commercial advertisements in a display or in a synthetic phonation in order to raise and enhance the effect of the commercial advertisement. The autonomously moving robot described in the reference 1 is designed to make gestures in response to the voices identified by a robot system in order to attract the audience's attentions.

Reference 1:

Paragraphs 0015 and 0020 to 0022 and FIGS. 1, 2, 5 and 6, Japanese Published Patent, 2003-50559, A (2000)

However the conventional autonomously moving robots have a problem that the robot can only behave in a regular action. This damages the autonomic reflex movement ancillary to autonomously moving robots so that the totally autonomous system is not appreciated. For examples, the conventional autonomous system plays back the regular gestures composed of action patterns programmed in the computer programs already installed therein and provides the obsolete information which is updated in the previous time, regardless to being compliant to the requirement at each moment.

In other words, the conventional autonomously moving robots retrieve data from the non-updated sources of information upon distribution and do not meet the requirement of timely updating, which is especially important for the news distribution and the weather report distribution.

The schedule information is an essential element for the autonomic reflex movement, action and task which are assigned to the autonomously moving robots. Particularly it is important that the autonomously moving robots store and retrieve the schedules in controlling the robotic systems to carry out such assigned tasks through the autonomic reflex systems therein.

The present invention has an advantage to realize and enhance the autonomic reflex system wherein appropriate action similar to human action is generated in response to the verbal communication with the objective persons, programs to provide the latest news and other public information are made and responding words are produced by using a conversation conversion table. The system is externally set and controlled by a schedule information input means.

BRIEF SUMMARY OF THE INVENTION

The present invention is realized in a system construction as shown in FIG. 1. The whole system in linked in a public network such as an Internet to which a lot of third party information providers are connected and many private LANs are linked. These are represented as third party information provider subsystems. Therefore, the present invention enables to access to and obtain the information in the public domain by using appropriate selection program. The local facility of the autonomous robot control system consists of a robot 1 or a plurality of robots, a transceiver 2, a local robot information controller 3 and a user controller adapted to user LAN called as "User LAN adaptive controller 5". The user implies the person who uses the robot for his and/or her specific purposes. The central facility of the autonomous robot control system is constructed with an information distribution manager.

The transceiver 2 and the local robot information controller 3 are connected to the robot application network 4. The use of the network is due to ease of system add-on, hardware updating and multiple-task executions. The transceiver is to communicate with the robot 1. The local robot information controller is to control the robot movement, action and information distribution. The user LAN adaptive controller is a controller to select and obtain the information available through the public network 8. The user LAN adaptive controller 5 is physically connected to the user LAN since the ease of access to the user LAN adaptive controller 5 is preferred by the users. The user LAN adaptive controller 5 sends the information for schedule to select and fetch the information available on the public network 8. The information distribution manager collects the information such as news and weather reports through the public network as requested by the user LAN adaptive controller 5 in accordance with their schedule. The information distribution manager manages the collected information for every user. The collected information is once stored in the storage devices and then transferred to the local robot information controller 3 as scheduled by the user LAN adaptive controller 5 or the requests sent from the local robot information controller 3. All of the information distribution services are developed on and installed in the information distribution manager 6.

In the present invention, the fundamental autonomous action of the robots are controlled by the robot local system installed in the robot body and the further actions and services necessary for high level autonomous behavior of the robot are generated and controlled by the local robot information controller 3 so that autonomous reflex system is realized by the mimicry in compliance with the situation of verbal communication and the appropriateness of information supply.

The task of the robot in the present invention is to provide the latest news or the information to the specific person while the robot is autonomously moving.

In order to attract the audience's attentions, a synthetic phonation can be the effective for raising the commercial advertisement. To generate an appropriate humane presentation of the information, the presentation is not only provided by the available information from the public channel as they are but by a phonation of such source of information. The words on the texts described in the source of information as news and weather reports converted into synthetic voice for phonation presentation. The sentences appropriate for kinds of information source are generated by existing technologies such as SGML (Standard Generalized Markup Language) wherein the marked up words are selected and DTD (Document Type Definition) wherein the structural analysis of the sentence is carried out. The sentences are regenerated being compliant to the marked up words which are selected by the category of information sources. The actions and behaviors of the robot are generated by the conversion of the marked up languages into gestures. The marked up languages are selected by exiting table of languages made for the categories of the information sources. The gesture synchronous to the phonation enhances the human affiliation for the audience whom the robot would provide the advertisement which is the information sources.

The present invention has an advantage to realize the autonomic reflex system wherein appropriate action with gestures similar to human action is generated in response to the words produced by a conversation conversion table associated with the sentence generation using the SGML.

According to the technical design and implementation as explained above, the resent invention has advantages as;
1) the robot obtains the latest information and distribute without updating by the operator,
2) the robot phonates the information and the person close to the robot can obtain the information without facing to the robot,
3) the robot provides the information with action so that the attentions of audiences are easily obtained and the information can be informed with impression to the audiences,
4) the operator can modify the schedule of the time that the robot provides the information and the kind of the information to provide so that the flexibility in scheduling for providing the information is feasible,
5) the operator can assign the schedule of providing the information so that the content and the frequency in providing information can be adjusted to the peoples and the group of peoples
6) the robot can newly obtain additional information available through the public network by adding a retrieval capability based on the words obtained in the verbal communication with the audiences.

Therefore, the present invention can realize an autonomously moving robot management system that provides the latest news, weather reports or other information with flexibility of the time and audiences.

BRIEF DESCRIPTION OF THE DRAWINGS

FIG. 2 is a data flow diagram that shows the data and control used for the autonomously moving robot management system of the first embodiment of the present invention.

FIG. 3 is a flow chart that shows the overall operation of the autonomously moving robot management system of the first embodiment of the present invention.

FIG. 4 is an information distribution schedule setup graphic (G1) of the first embodiment of the presenting invention.

FIG. 5 is an information distribution schedule setup graphic (G2) of the first embodiment of the presenting invention.

FIG. 6 is an information distribution schedule setup graphic (G3) of the first embodiment of the presenting invention.

FIG. 9 is an example of the gesture conversion table of the first embodiment of the present invention.

DETAILED DISCRIPTION OF THE INVENTION

The details of the present embodiment of the present invention are explained by using the figures.

FIRST EMBODIMENT

Figure 1:
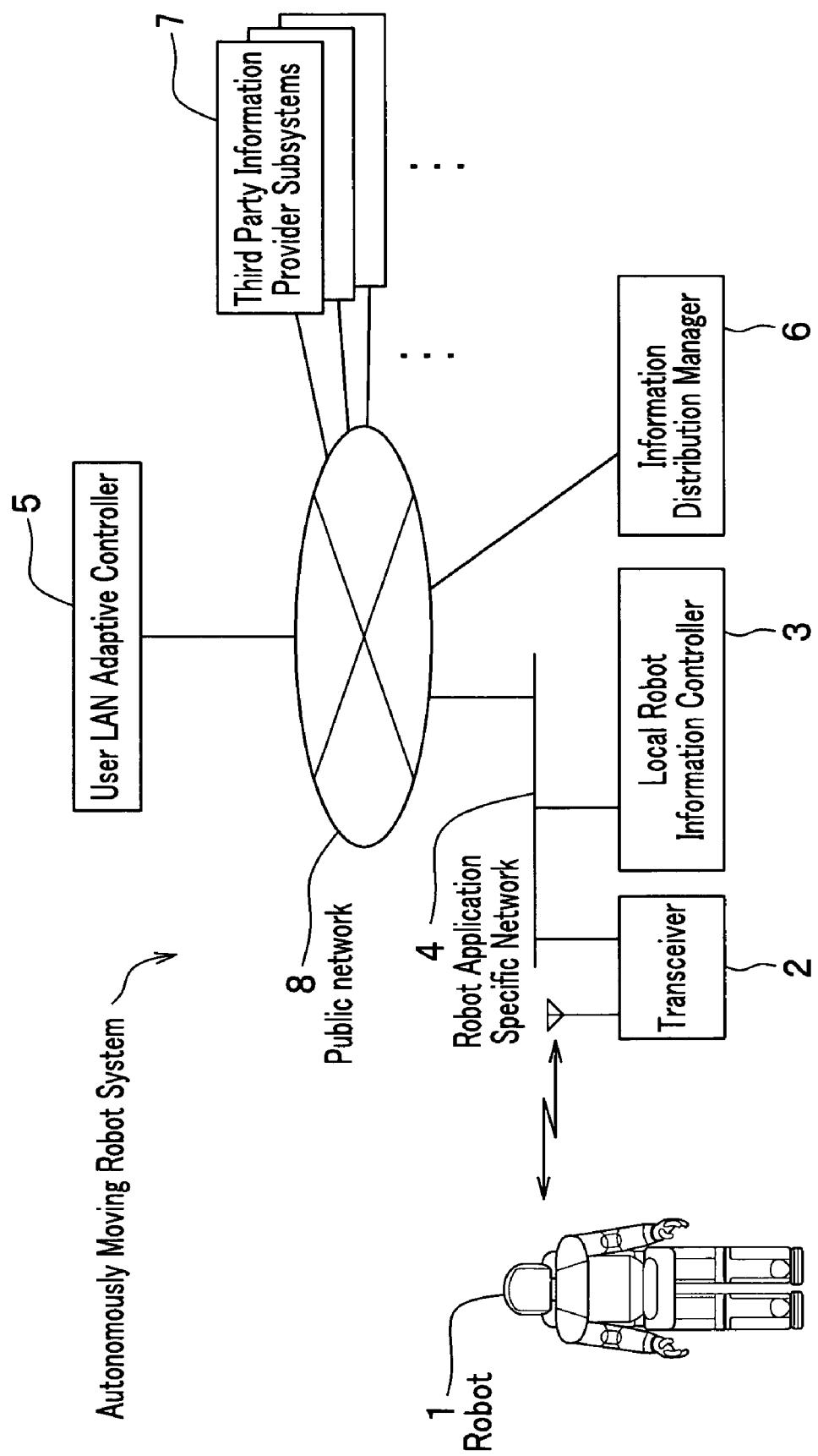
FIG. 1 is a system block diagram that shows the autonomously moving robot management system of the first embodiment of the present invention.

In the FIG. 1, the first embodiment is shown as the autonomously moving robot control system wherein the robot distributes the information to the objective persons in accordance with the schedule that the robot user has set.

As shown in FIG. 1, the robot 1 and the local robot information controller 3 is linked through the transceiver 2. The transceiver 2 and the local robot information controller 3 are connected with a robot application specific network 4. The robot application specific network 4, a user controller adapted to a user LAN (called a user LAN adaptive controller 5) and an information distribution manager 6 are linked with the public network 8 to which various third parties are providing their information by third party information provider subsystems.

The robot 1 moves in a region assigned by a map, as called "global map", dedicated for the robot immigration. The user input the original map or the geographic information to the global map. The task of the robot is to distribute the information while the robot is autonomously moving around the region. The robot receives the information necessary for the task and the immigration from the local robot information controller 3 via the robot application specific network 4. The transceiver 2 is a communication interpreter including the protocol controlling and data packet handling and management between the communication with the robot and the wireless communication with the local robot information controller through the robot application specific network 4.

The local robot information controller 3 composes of a user local network which is linked with the public network 8 to which the user LAN supporting the user controller (which is the user LAN adaptive controller), third party information provider subsystems and the information distribution manager 6 are linked. The local robot information controller 3 receives the information once dumped into the information distribution manager 6 from the information distribution manager again in a form of data packet through the public network 8 and the robot application specific network 4. Then the received data is sent to the robot 1 after being interpreted and converted by the local robot information controller 3 to be readable for the robot 1. The local robot information controller 3 is constructed with a PC that support the robot application specific network controlling, the management of the files dumped from the information distribution manager and the robot control data processing. The robot application specific network is a small scale LAN to which the devices such as the transceiver 2 and the local robot information controller 3 especially the part of the robot control device which function as the output and input of the robot control data processing. The user LAN adaptive controller 5 sends the control data to the information distribution manager 6 for the purpose to select the data which the user requires the robot to use in carrying out the task done by the robot. In hardware wise, the user LAN adaptive controller 5 is constructed with a PC. The robot 1, the transceiver 2, the local robot information controller 3, the robot application specific network 4 and the user LAN adaptive controller 5 are set in the user site as a building where the user wants to use the robot such as a department store. A group of these devices composes one autonomous robot control system including the autonomous robot itself. Each user uses a group of these devices for the task he and/or she wants the robot to carry out. Since plural groups of these devices can be linked to the public network 8, the plural users can simultaneously but independently use the autonomous robots.

The information distribution manager 6 can communicate with the user LAN adaptive controller 5 and receive the data that include the control data by which the information distribution manager 6 retrieves the necessary data locating in the third party information provider subsystem and dumps them into the storage devices installed therein. It is necessary that the information distribution manager 6 operates at any time and therefore a file server system is used. In order to easily control each user, the local subsystem working under the file server system is designed to support user files in a user management system. The third party information provider subsystems 7 are connected to the public network 8 which is in a public domain and have a capability to provide service information on request. The third party information provider subsystems 7 are equipped to the companies which are settled for topical news and weather report services. The robot application network is linked to the public network 8.

<Functional System Design>

The functional system design of the autonomously moving robot regarding the first embodiment of the present invention is explained. FIG. 2 shows the information handling from the third party information provider subsystems to the autonomously moving robot which is replying to objective humans. The transceiver 2 and the public network 8 are not shown since they are handling information in a well-known existing technology and not specific to the present invention.

The robot 1 includes a voice manager 11 which consists of a voice recognizer and a voice synthesizer, an information distribution scheduler 12, a moving planner 13, a kinematic controller 14 and a kinematic mechanism 15. The voice manager 11 has a function to recognize the human voice collected by the microphone installed in the robot and another function to output the sound of synthetic voice generated by the voice synthesizer implemented therein through the loud speaker installed in the robot. According to the voice recognition and voice generation, the robot can realize a voice communication capability that results in human affiliation. The information distribution scheduler 12 carries out the time schedule to provide the scheduled information by the robot 1 in a way to send the communication command to the voice manager 11, the moving initiation command to the moving planner 13 and the action command to kinematic controller 14 that is triggered by the moving initiation command. The moving initiation command generates the route directive on the basis of the location information of the destination and the route maps transferred from the local robot information controller 3 and the present position information obtained by the kinematic controller 14. The kinematic controller 14 sends the detailed gesture directive to the kinematic mechanism 15. In response to such detailed gesture directive, the kinematic mechanism 15 controls the movements of the neck, legs, arms and hands of the robot 1.

The local robot information controller 3 includes a synthetic voice confirmer 31, a voice synthetic data memory 32, information distribution controller 33, gesture conversion table memory 34, gesture data memory 35, distribution information memory 36 and moving route memory 37.

The synthetic voice confirmer 31 analyzes the voice sound in terms of the suitability for the person to communicate with and optimize the synthesis and intonation to the person. A voice synthetic data memory 32 memorizes the synthetic data input through information distribution controller 33 and records them. The synthetic data is sent to the voice manager 11 in the robot 1 and given to the human as it is. The information distribution controller 33 periodically acquires the periodically updated information recorded in distribution information memory 36 and converts it into voice synthetic data and the gesture data and then dumps into the voice synthetic data memory 32 and the gesture data memory 35. The details of the conversion will be explained later. The information in the distribution information memory 36 is periodically updated. The gesture conversion table memory 34 memorizes the gesture conversion table that is used for converting such periodically updated information. The gesture data memory 35 memorizes the gestured date which is input from the information distribution controller 33 and sent to the information distribution scheduler 12 installed in the robot 1. The distribution information memory 36 memorizes the periodically updated information which is once stored in the information distribution manager 6 sourced from the third party information provider subsystems 7 and the information distribution schedule sent by the information distribution manager 6. The periodically updated information is sent to the information distribution controller 33. The information distribution schedule is sent to the information distribution scheduler 12 installed in the robot 1. The moving route memory 37 memorizes the moving route data which is sent to the moving planner 13. The moving data shows the route maps towards the destination.

The information distribution manager 6 includes information distribution schedule manager 61 and information distribution user manager 62. The information distribution schedule manager 61 refers and confirms the registration data of the users and accesses the URL (Uniform Resource Locators) of which data are to be verified. The information distribution schedule manager 61 sends the information distribution schedule to each user. The information distribution schedule manager 61 periodically accesses the information from the third party information provider subsystems 7 and sends it to the local robot information controller 3 of each user. The information from the third party information provider subsystems 7 is finally memorized in the distribution information memory 36. The information distribution user manager 62 manages the information distribution schedule of each user that shows the time schedule of the information provided by the robot 1. The information distribution schedule is set by the user LAN adaptive controller 5.

The user LAN adaptive controller 5 has a graphic capability that is an information distribution schedule setup graphic 51 and a moving route setup graphic 52. The users can set up the information distribution schedule and the moving route of the robot using these graphic presentations. The third party information provider subsystem 7 has updated information memory 71 to which news and weather reports are dumped by the information distribution service companies. These memories are constructed by hard disk drives managed by the PCs.

(System Operation)

The first embodiment of the present invention regarding the autonomously moving robot will be explained in the details of the operation by using FIG. 3. In the steps as S201 to S204, the initial data for the robot operation as information distribution schedule and the route maps are set. By using the information distribution schedule setup graphic 51 on the user LAN adaptive controller 5, the user inputs the information distribution schedule which is the time schedule of acquiring the news and whether report service information and providing it to the persons whom the robot will encounter (step S201). Then the information distribution schedule is recorded in the information distribution user manager 62 filed in the local subsystem of the file server installed in the information distribution manager 6. By using the moving route setup graphic 52 on the user LAN adaptive controller 5, the user input the route maps (step S202). The route maps are conformed on a global map where the transporting and moving areas as the floors of department stores are shown. The user can input the route data such as destinations, order of visiting, staying time at the destinations. Then the route data is recorded in the moving route memory 37 installed in the local robot information controller 3. The information distribution schedule manager 61 installed in the information distribution manager 6 confirms the URL of the information sources described in the information distribution schedule set in the step S201 by accessing the actual URL. When the access has been successfully completed, the URL is judged as a correct one. After this confirmation, the information distribution manager 6 sends the information distribution schedule to the local robot information controller 3 (step S023). When the access is not normally terminated, the information distribution manager 6 sends the warning message to the user LAN adaptive controller. The local robot information controller 3 records the information distribution schedule in the distribution information memory 36 and sends the information distribution schedule to the robot 1 (step S204). It may be accepted to send the information distribution schedule to the plural robots as well as a single robot 1. The high level management of the information distribution schedule is carried out by the local robot information controller 3 so that the system collision among the plural robots regarding the data handling and transaction between the robots and the local robot information controller 3. The example of usage of plural robots is that a robot is placed in every floor and the same information distribution schedule is sent to all of the robots simultaneously carry out the same actions.

For the steps S205 to S207, the local robot information controller 3 obtains the periodically updated information from the third party information provider subsystems 7. The information distribution schedule manager 61 in the information distribution manager 6 refers the acquisition time of the information distribution time recorded in the information distribution user manager 62 with the actual time. If acquisition time meets the actual time, then the information distribution manager 6 accesses the URL of the information source and obtains the periodically updated information from the updated information memory 71 in third party information provider subsystems 7 (step S205). After obtaining the periodically updated information, the information distribution manager sends such periodically updated information to the local robot information controller 3 which records the information in the distribution information memory 36. The information distribution controller 33 converts the periodically updated information into the voice synthetic data and gesture data (S206) and records these voice synthetic data and the gesture data into the voice synthetic data memory 32 and the gesture data memory 35, respectively. The periodically updated information, which has been converted into the conversion voice synthetic data and the gesture data are once recorded and then are sent to the robot 1 (step S207). The robot 1 keeps the received the voice synthetic data in the voice manager 11 and the received gesture data in the information distribution scheduler 12.

The step S208 is the step where the robot 1 provides the updated information and moves on to the next destination. The information distribution scheduler 12 refers the information providing time of the information distribution schedule obtained from the local information controller 3. When the time coincides with the scheduled time, the information distribution scheduler 12 carries out the process to reproduce the voice synthetic data and the gesture data which correspond to the kinds of the source information which is periodically updated information recorded in the distribution information memory 36. In order to reproduce the voice synthetic data, the information distribution scheduler 12 sends SPEAK command to the voice manager 11. By receiving SPEAK command, the voice manager 11 reproduces the statement by existing sentence generation software, such as SGML, wherein the statement corresponds to the kinds of the source information among the various category of the source information recorded in the voice synthetic data memory 32. The statement is converted into the voice synthetic data by the control of the voice manager 11 and phonated by a loud speaker installed in the robot.

On the other hand, the information distribution scheduler 12 generates an action command that is selected from the gesture data recorded in the gesture data recorder 35 and sends the action command to the kinematic controller 14. The kinematic controller 14 converts the action command into plural specific sequential movements of the robot parts and then the directive for such sequential movements is sent to the kinematic mechanism 15. The kinematic mechanism 15 drives the neck joints and arm joints in such sequential movements. For the distributed system, it is not necessary that the robot1 keeps the voice synthetic data and gesture data in the storage or memory device set in the robot 1. The local robot information controller holds these data in the voice synthetic data memory 32 and the gesture data memory 35.

The information distribution scheduler 12 is triggered by a voice command or the computer command ordered by the location robot information controller 3 and then sends the route directive to the kinematic controller 14. The route directive includes the position information of the destination and the route maps which are sent from the local robot information controller 3. The information of the robot position obtained by the kinematic controller 14 which includes the position estimator is used for the navigation in the robot movement. The kinematic mechanism 15 drives the leg and joints for the robot 1 to move forward.

<Setting the Information Distribution Schedule>

The setting of the information distribution schedule (the step S201 in FIG. 3) will be explained in reference to FIG. 4 to FIG. 7. We call the graphic presentations on the computer display as G1 frame, G2 frame, etc. for the purpose of simplicity. These frames are shown on the display of the user LAN adaptive controller 5. The user sets the kinds of the information, the time to provide the information and the time to acquire the information, to be provided to the peoples, from the third party information provider subsystems 7. The information setting is carried out on the menu shown in G1 frame. The kinds of information can be selected by clicking the boxes of the items. The time to provide the information and the time to acquire the information are assigned by the selection of bar chart of the time scale. Several time frames, such as 8 o'clock and 9 o'clock, can be selected on the bar chart. The time to acquire the source information is set in prior to the time to provide the time. For example, the local topical news is to be provided at 9, 10 and 11 o'clock etc. and the acquisition time is set as 15 minutes. The actual acquisition time is 8:45, 9:45 and 9:45 etc. Before setting this frame, a user frame is shown on the display and the user input the user ID and the pass word. The information set in the G1 frame is bound with such user information. In accordance with the information set as in G1 frame, the information distribution manager 6 records the user information, the kinds of information, the information distribution time and the information acquisition time in the user file in the information distribution user manager 62. The finer bar chart can be used in order to set the time for 24 hours. The pop-up menu for setting the specific minutes and seconds for the information distribution can be used. The pop-up for setting minutes is created for each hour of the bar chart and the further pop-up for setting seconds is created for minute of the bar chart.

By clicking "Content Setting" of B1 after selecting "Japan" in G1 frame, a new frame G2 comes out. It is possible to select the cities such as "Sapporo", "Today's Weather" and "Tomorrow Forecast". The selected items are recorded in the user file and turns back to G1 frame shown in FIG. 4 when "Close" is clicked.

When "Latest Information List" is clicked, G3 frame shown in FIG. 6 comes out. This frame shows the latest contents of the information which is selected in "Kinds of Information" in G1 frame. The user can finally confirm the content of the latest information and therefore the user can make the judgment whether the kind of information should be selected. When "Close" is selected, the frame returns to G1 frame.

By clicking "Information Distribution Determination", all of the parameters set in the information distribution schedule G1 are in effect and these parameters are recorded in the user files in the information distribution user manager 62 in the information distribution manger 6. All of these parameters are loaded to the distribution information memory 36 installed in the local robot information controller 3. By clicking "Automatic Loading Start", the information distribution manager 6 records all of the parameter in the information distribution user manager 62 as the setup process done by clicking "Information Distribution Determination", however an additional operation is carried out. That is to confirm the completion of sending the parameters to the local robot information controller 3 by a verification process regardless the internet traffic conditions.

Figure 7:
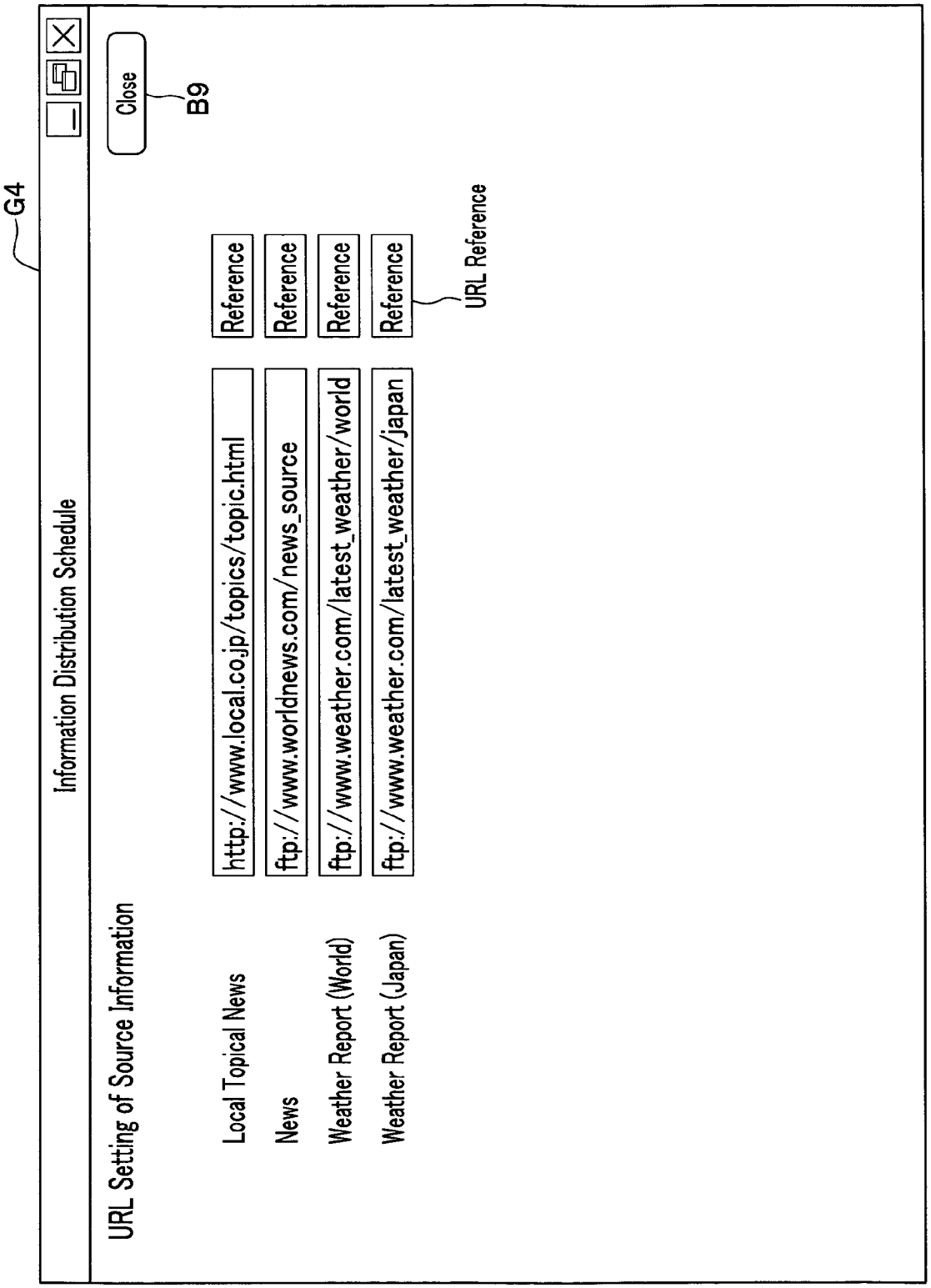
FIG. 7 is an information distribution schedule setup graphic (G4) of the first embodiment of the presenting invention.

By clicking "Setting URL of Source Information", G4 frame as shown in FIG. 7 comes out. The URL of the source information can be obtained in accordance with the kinds of information and the URL can be modified as desired. The software handler of the information distribution schedule can handle "http" (Hyper Text Transfer Protocol) and "ftp" (File Transfer Protocol) which are obtained in the communication phase and present on G4 frame. The user can manually confirm the correctness of URL which he or she has set and check the content of source information. By clicking "Close", the user returns to G1 frame.

By clicking Selective Reset, the parameters set in "Kinds of information", "Time for information distribution" and "Time for information acquiring" are cleared off, which is a convenient function for setting the parameters from the initial step.

<Converting Periodically Updated Information>

Figure 8:
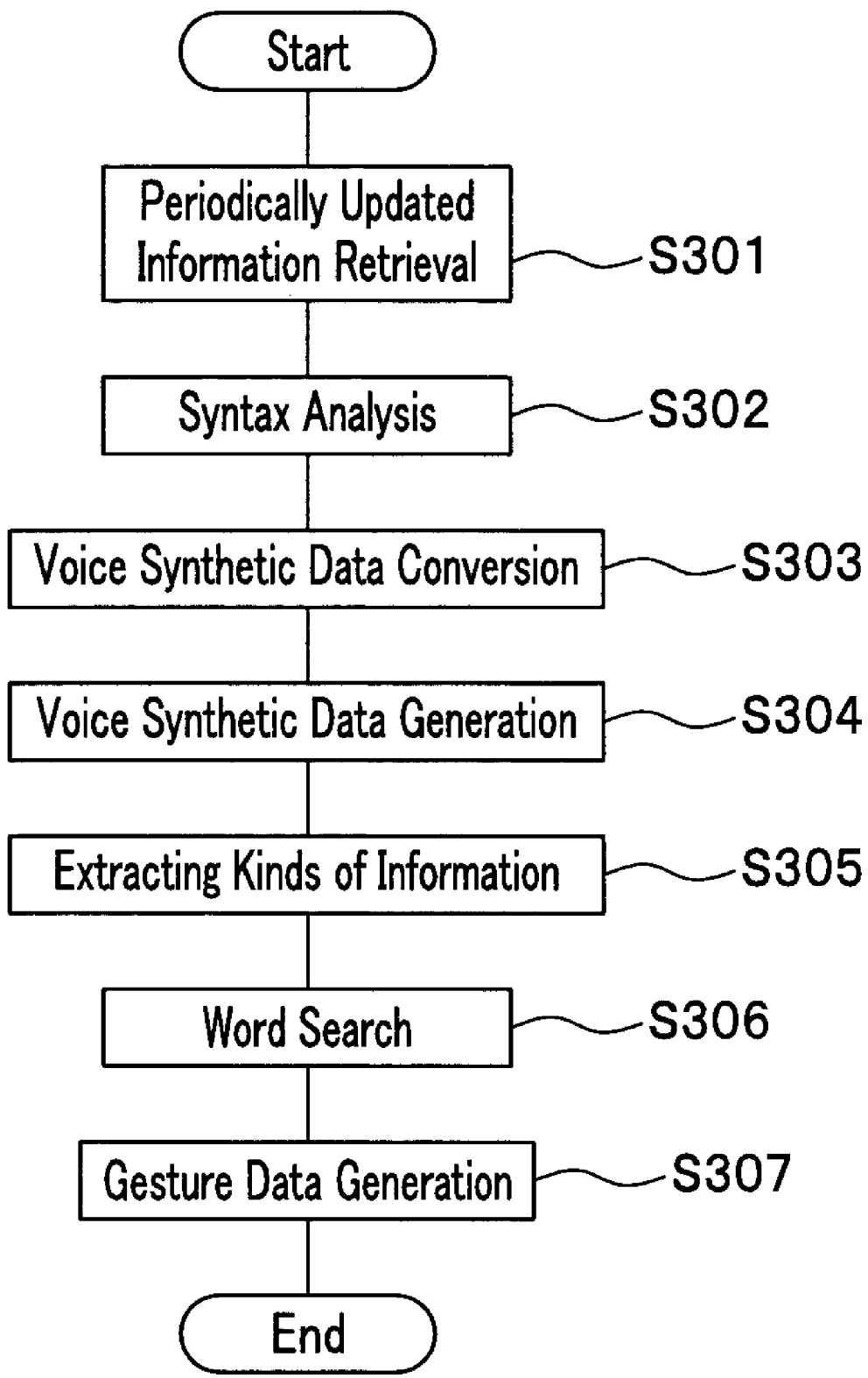
FIG. 8 is a flow chart that shows the operation of converting periodically updated information of the first embodiment of the present invention.

The step of "converting periodically updated information" S206 is explained by using FIG. 8. This step is to convert the periodically updated information acquired from the third party information provider subsystem 7. The conversion is mainly carried out by the information distribution controller 33 in the local robot controller 3. The information distribution controller 33 retrieves the periodically updated information from distribution information memory 36 (step S301). The periodically update information has been dumped in a file that includes the text decomposed from the raw data of the periodically update information and the qualifier which is the kinds of the information as shown in FIG. 4. The file is called a distributing information file hereinafter and recorded in the distribution information memory. The file is composed by the text data which the information distribution schedule manager 61 extracts from the raw data dumped from the third party information provider subsystem 7 and the parameter of kinds of information which is recorded in the user file generated in the local subsystem installed in the file server which is the fundamental system to support the information distributing management of the information distribution manager 6. The text data composed in the distributing information file is analyzed in syntax (step S302). The syntax analysis is to decompose the sentences included in the text data into an assembly of words and specify the parts of speeches in order to start SGML (S303). Then the voice sentence is regenerated from the marked up words used in SGML and DTD to be compliant to the kinds of information for their categories. Auxiliary verbs are amended or changed to verbal expression to create natural expression particular to Japanese language. If necessary the broadcast code is applied to be suitable for sociality. Dummy words and intonation are added in the process of the voice synthetic generation to avoid the monotonic phonation. The conversion technology of the written language to the verbal language has been published in Japanese Published Patent, 2002-149180, A (2002). The syntax analysis, the voice sentence regeneration and the conversion to the verbal language are processed in the information distribution controller 33. The text data of the periodically updated information is converted into the voice synthetic data in Voice Synthetic Data Generation (step S304) and recorded in the voice synthetic data memory 32 with the associated parameters of kinds of information. The user can confirm, modify and trim the voice sentences, dummy words and intonation by the information distribution controller 33.

The parameter of the kinds of information is extracted from the distributing information file (S305). The information distribution controller 33 has a wild-card capability to retrieve or search the files and data. Therefore all possible categories of the kinds of information can be accessed. This contributes to generate gesture data. The steps for gesture data generation comes after the voice synthetic data generation in sequence.

Once the word "fine" is found in the text data in the distributing information file, the positive action such as raising hands is selected. However the sentence includes "not to be fine", then the positive action is not selected. The nodding gesture which indicates the natural talking behavior is selected from the table as shown in FIG. 9. If the sentences do include "clear", "fine", "cloud", "rain" and "snow" and then the selected actions are converted into the gesture data in Gesture Data Generation (step S307). A file called "gesture file" is compiled with the parameter of kinds of information and recorded in the gesture data memory 35.

SECOND EMBODIMENT

Figure 10:
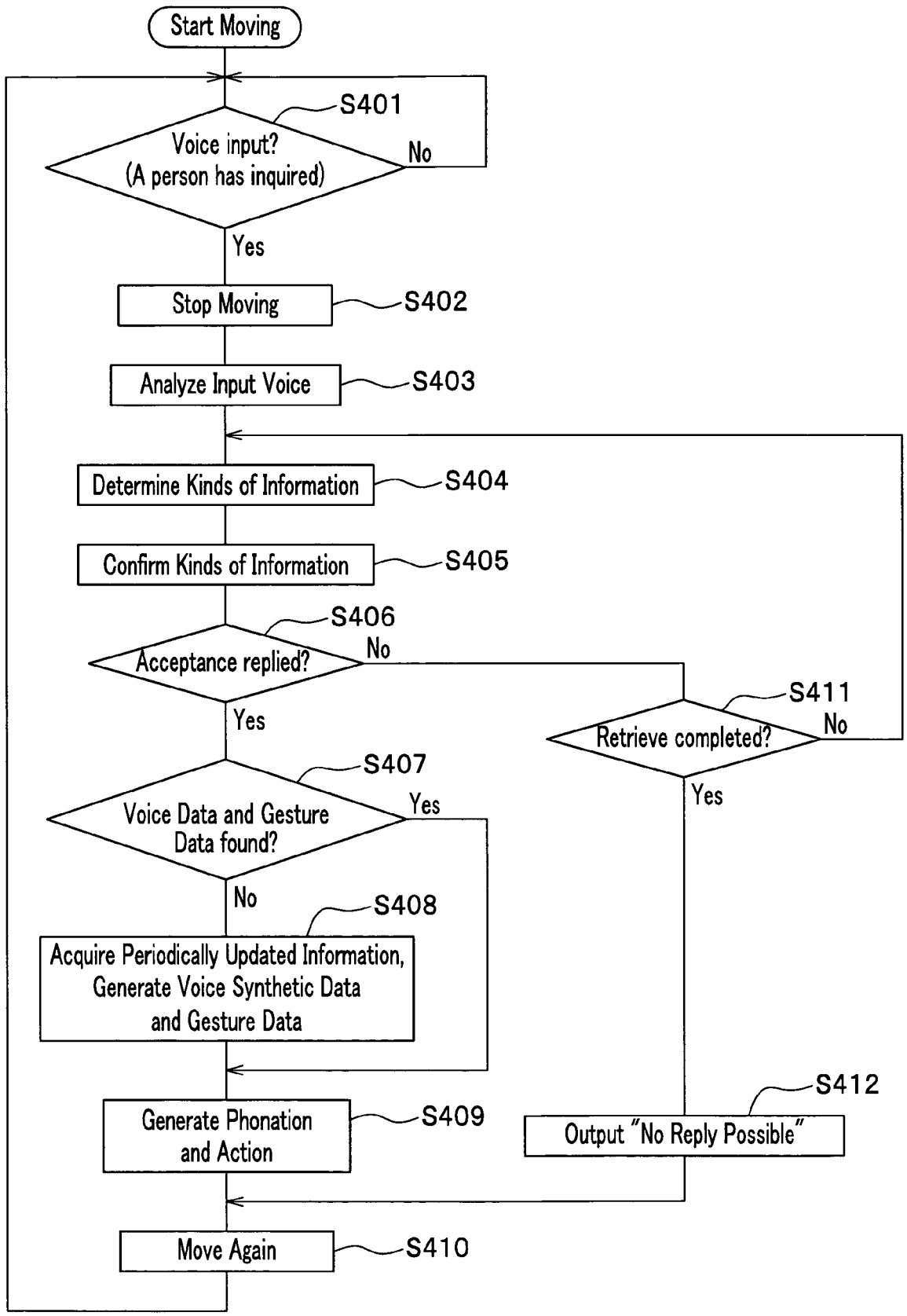
FIG. 10 shows a sequential flow of the robot reaction for a person inquiring while the robot is moving.

The details of the second embodiment, which is about the action to reply to the person who asks to the robot while the robot is moving toward the destinations, will be explained. The overlapped explanation with the first embodiment will be omitted. However FIGS. 1 and 2 will be exploited on necessity. FIG. 10 shows a sequential flow of the robot reaction for a person inquiring while the robot is moving. While the robot moving, the voice manager 11 check the collection of human voice by the microphone set in the robot for certain time interval, for example, every one second (step S401). The robot keeps moving to the next visiting destination if no human voice is detected ("No" selection at step S401). If the human voice is detected ("Yes" is selected at step S401), the robot stops (step S402) and the voice analysis starts (step S403) by the voice manager 11. In this analysis, the voice sentence is converted into text information (code information) by the voice recognition technology and then the text information is analyzed in syntax. According to the result of the syntax analysis, the kind of the information is determined (S404) by the words such as the nouns found in the syntax analysis. This is done by the same procedure as S305. The voice manager 11 puts the words, which are the determined title as the kind of the information, being phonated in order to confirm that this title is the category of the kind of information (step S405).

When the robot receives the reply from the person the robot encounters, the voice manager 11 checks the voice synthetic data and gesture data in the resource which the manager 11 can access (step S407). As for the voice synthetic data, the voice manager 11 checks whether the title of the kind of the information is kept in the index of the voice synthetic data therein or recorded in the voice synthetic data memory 32. As for the gesture data, the information distribution scheduler 12 checks whether the title of the kind of the information is kept in the index of the gesture data made in Gesture Data Generation (step S307) or recorded in the gesture data memory 35. If the existence of voice synthetic data or the gesture data is not found in the above process ("No" in step S407), that happens when the system starts because no periodically updated information from the third party information provider subsystem 7 has been acquired just after the parameters in G1 frame as "Information Distribution Schedule" have been set, the information distribution controller 33 tries to obtain the periodically updated information from the third party information provider subsystem 7 in reference with the kinds of the information and extract the text information and generates the voice synthetic data and the gesture data (step S408). If the existence of the voice synthetic data or the gesture data is not found in the above process ("Yes" in step S407), the pointer digresses the step S408 and the information distribution scheduler 12 generates the phonation and actions (step S409). This sequential flow for the robot to finally phonate and act in response to the person who has inquired to the robot realizes the robot autonomous action to human. After this phonation and action, the robot 1 keeps going to the next visiting destination (step S41).

OTHER EMBODIMENTS

Although there have been disclosed what are the patent embodiment of the invention, it will be understood by person skilled in the art that variations and modifications may be made thereto without departing from the scope of the invention. For such scope the further preferred embodiments are provided as bellows;

1) The information retrieved from the third party information provider subsystem and provided by the robot 1 has been described as the periodically updated information in the present invention. However it not limited to such the periodically updated information but urgent announcement, disastrous news and annual festivals that are rather less often provided information.
2) The above embodiments are designed that the information distribution schedule setup graphic 51 and the moving route setup graphic 52 are given on the display in the user LAN adaptive controller. These graphics can be given on the display attached to the local robot information controller 3.
3) The above invention is designed that the robot 1 goes to each destination and provides the periodically updated information at such place regardless to the presence of humans around the robot. However it is possible to design the robot keeps going if he perceives no humans at the destinations. The existing technology to detect the presence of humans is disclosed in the Japanese published patent application, 2003-50559 as the reference 1.
4) In the above invention, the information distribution schedule and route maps are independently setup and therefore the information providing action of the robot 1 is controlled regardless to the place or the humans the robot encounters. It is possible to information providing action is controlled in even driven manner not in time-base manner as the above embodiment shows. The event can be categorized with the condition such as the visiting place and the kinds of information. Therefore it is possible that the robot provides the information preferred by little children at the place of toy shop which the robot 1 visits. Also the robot 1 provides news at his visiting place that is the reception. It is possible to design that the robot provides the periodically updated information in compliance with the place and demands of the information. While the robot is moving, the information distribution time has come then the robot stops to provide the information.

As the details of the embodiments have been explained, the operation necessary for the embodiment as shown in FIG. 2 can be computerized and the computer programs are recorded in a computer readable media. Such media can be installed in the computer system as executable files and realizes the autonomous moving robot management system. The computer system implies the software programs such as an operating system and application systems and hardware resources as computer boards, controller boards and peripheral apparatus and devices.

What is claimed is:

1. An autonomously moving robot management system comprising an information distribution management means, a robot information control means, a user setup means and a robot which has a kinetic-controllable moving means, wherein said information distribution management means has a data retrieval capability to obtain latest information at least including letter codes periodically updated from an information providing means in accordance with a predetermined schedule given by said user setup means and record said latest information periodically updated in a memory means as a distribution information file, said robot information control means has a text data generating capability to generate text data from said distribution information file including said latest information periodically updated, a syntax analysis capability to generate an assembly of words to be presented, a voice synthetic data generation capability to generate voice sentences through a process of voice synthetic data conversion and gesture data generation capability to generate physical gesture data by extracting words registered in a predetermined table from said text data in said distributing information file including said latest information periodically updated and said robot has a moving capability to move in accordance with a route directed by said user setup means under a control of said kinetic-controllable moving means and an action capability to obtain said gesture data and voice synthetic data from said information distribution management means and generate phonation and actions assigned by said gesture data and voice synthetic data on a time schedule which is setup through said user setup means.

2. An autonomously moving robot management system according to claim 1, wherein said information distribution management means and said user setup means are connected to a public communication network to which said information providing means connected with or linked to and said robot information control means is connected through an application network through which communication between said robot and said robot information control means is created.

3. An autonomously moving robot management system according to claim 1, wherein said process of voice synthetic data conversion is carried out under a prescription of parameters set by said user setup means and said predetermined table used for generating said gesture data is set by said user setup means.

4. An autonomously moving robot management system according to claim 1, wherein said user setup means has a capability to set a time and a kind of latest information periodically updated in an information distribution schedule manager installed in said information distribution manager so that said information distribution schedule manager acquires said latest information periodically updated from said information providing means and extracts text data therefrom.

5. An autonomously moving robot management system according to claim 1, wherein said user setup means has a capability to set the information distribution schedule in accordance to which said robot provides said information, wherein said information distribution schedule is stored in an information distribution user manager transferred to a distribution information memory which records files of said periodically updated information, an information distribution controller has a capability to obtain said files and inputs a gesture data to information distribution scheduler installed in said robot via a gesture data memory wherein said information distribution scheduler sends a directive regarding said gesture data to a kinematic controller under schedule management carried out by said information distribution controller and a voice synthetic data memory has a capability to store synthetic data which are input through said information distribution controller periodically acquiring said files which are converted into voice synthetic data being sent to a voice manager installed in said robot.

6. An autonomously moving robot management system according to claim 1, wherein said robot further has a microphone so that human voice is detected thereby, processed through voice analysis and recognition of which functions are implemented in said voice manager and converted into said text data which is analyzed to determine kind of information presented in said human voice using a syntax analysis which is done in said information distribution controller and said voice manager that phonates words which are determined by said syntax analysis as a category corresponding to said kind of information.

7. An autonomously moving robot management system according to claim 1, wherein said robot information controller means further has a voice synthetic data memory which records said voice sentences, a category corresponding to said voice sentences, and at least one associated parameter corresponding to said voice sentences.

8. An autonomously moving robot management system according to claim 1, wherein said information distribution controller carries out comparison of said words determined by said voice manager with said voice sentences, said category and associated parameter of said kind of information recorded in said voice synthetic data memory and obtains said distribution information file originated by said information at least including letter codes from said information providing means by virtue of intervention of said information distribution management means unless matching in said comparison is obtained so that said text data is generated from said distribution information file and kind of information is newly determined by said text data.

* * * * *